(12) United States Patent
Culbertson et al.

(10) Patent No.: US 6,665,276 B1
(45) Date of Patent: Dec. 16, 2003

(54) FULL DUPLEX TRANSCEIVER

(75) Inventors: David L. Culbertson, New London, CT (US); Raymond F. Travelyn, Westerly, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/513,740

(22) Filed: Feb. 24, 2000

(51) Int. Cl.7 .............................................. H04B 1/44
(52) U.S. Cl. ...................................... 370/282; 455/83
(58) Field of Search ............................... 370/276, 278, 370/282; 455/73, 82, 83, 85, 557

(56) References Cited

U.S. PATENT DOCUMENTS

| | | | | |
|---|---|---|---|---|
| 5,278,832 A | * | 1/1994 | Binzel et al. ............... | 370/347 |
| 5,398,258 A | * | 3/1995 | Su et al. ..................... | 375/277 |
| 5,475,677 A | * | 12/1995 | Arnold et al. .............. | 370/280 |
| 5,483,676 A | * | 1/1996 | Mahany et al. ............ | 455/67.4 |
| 5,953,640 A | * | 9/1999 | Meador et al. ............. | 455/73 |
| 6,154,642 A | * | 11/2000 | Dumont et al. ............. | 455/403 |
| 6,163,568 A | * | 12/2000 | Lansford et al. ............ | 375/219 |
| 6,278,864 B1 | * | 8/2001 | Cummins et al. .......... | 455/73 |

* cited by examiner

Primary Examiner—Hassan Kizou
Assistant Examiner—Dmitry Levitan
(74) Attorney, Agent, or Firm—James M. Kasischke; Jean-Paul A. Nasser; Michael F. Oglo

(57) ABSTRACT

A RF front end to an IF generator and post-processor whereby the IF generator output is variable. The transceiver up-conversion path includes an IF Filter, the output of which is input to a mixer with the output of a fixed Phase Locked Oscillator (PLO). The mixer output is input to a band-pass filter and amplified. With a single antenna configuration, the amplifier output connects to either an internal or external diplexer that interfaces to the antenna. With a dual antenna configuration, the amplifier output interfaces directly to the antenna. Similarly, the down-conversion path includes an internal or external diplexer in the single antenna configuration, a band-pass filter, a RF amplifier, a mixer that receives the RF amplifier output and the fixed PLO as inputs, an IF Filter, IF amplifier, and an attenuator for interfacing to the IF post-processor. A user-interface allows RF TX and RX frequency selection, data rate selection, and configurable options including internal or external diplexer, internal or external oscillator reference, and TX amplifier keying to allow simplex, half duplex, or full duplex communication.

9 Claims, 4 Drawing Sheets

FULL DUPLEX TRANSCEIVER

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention relates generally to a transceiver for data communication, and more particularly to a Radio Frequency (RF) front end to a standard IF (Intermediate Frequency) modem to allow full duplex data communication at RF.

(2) Description of the Prior Art

For a full duplex communication transceiver, the transceiver's transmitter and receiver are simultaneously active, thereby allowing simultaneous data transmission and reception. Depending upon the design considerations, a full duplex transceiver's transmit and receive antennae are often the same. When transmit and receive frequencies are similar, interference is often encountered although separate transmission and receive antennae are employed.

Methodologies and systems for avoiding transmit and receive signal interference include U.S. Pat. No. 5,905,706 to Vidales wherein half-bit transmission and reception intervals are formed; U.S. Pat. No. 5,715,520 to Hillock, et al, for Time Division Duplex (TDD) systems to utilize a single Local Oscillator (LO) to derive two LO signals at different times, thereafter using the two LO signals to produce an intermediate and an offset signal frequency; U.S. Pat. No. 5,687,169 to Fullerton describes a pulse interleaving method and apparatus for impulse radio's ultrawide-band communications; and, U.S. Pat. No. 5,533,056 to Cripps provides a duplex transceiver binary encoder/decoder.

U.S. Pat. No. 5,881,369 to Dean, et al, describes a duplex receiver operational in Frequency Division Duplex (FDD) and Time Division Duplex (TDD) modes. The Dean, et al, transceiver has an up-conversion path that converts an Intermediate Frequency (IF) to a Radio Frequency (RF) in either an upper RF frequency range or a lower RF frequency range, and similarly a down-conversion path to convert the received RF frequency in either the upper or lower frequency range to a desirable IF frequency. The Dean, et al, up-conversion and down-conversion paths connect to either an upper or lower band diplexer port through a switch array. A switch controller controls the switch array based upon whether the transceiver is operating in TDD or FDD mode. The Dean, et al, invention concentrates on cellular communication requirements and demands.

General data communication between a transmitter and receiver are less restrictive than the cellular requirements. Higher frequency data communication allows more rapid communication rates; however, typical modems for data communication operate in the IF frequency band.

There is currently no apparatus or method for a full duplex transceiver at the Radio Frequency (RF) bands, wherein RF is derived from a variable IF frequency.

What is needed is a method and apparatus to convert an IF generator output to RF for full duplex communication.

SUMMARY OF THE INVENTION

It is a general purpose and object of the present invention to provide a configurable transceiver architecture that allows simplex, half-duplex, and full duplex operation. Another object of the present invention is to provide a transceiver architecture that accepts a variable IF as input, and generates a RF output for data communication using fixed Phase Locked Oscillators (PLOs). A further object is to provide a transceiver that receives a RF signal and converts the RF signal to an IF signal using fixed PLOs. Still yet another object is to provide such configurable transceiver architecture for single or dual antenna use, utilizing internal, external, or no diplexer, and allowing internal or external oscillator references.

Other objects and advantages of the present invention will become more obvious hereinafter in the specification and drawings.

These objects are accomplished with the present invention by a RF front end to an IF generator and post-processor whereby the IF generator output is variable. The transceiver up-conversion path includes an IF Filter, the output of which is input to a mixer with the output of a fixed Phase Locked Oscillator (PLO). The mixer output is input to a band-pass filter and amplified. With a single antenna configuration, the amplifier output connects to either an internal or external diplexer that interfaces to the antenna. With a dual antenna configuration, the amplifier output interfaces directly to the transmit antenna. Similarly, the down-conversion path includes an internal or external diplexer in the single antenna configuration, a band-pass filter, a RF amplifier, a mixer that receives the RF amplifier output and the fixed PLO as inputs, an IF Filter, IF amplifier, and an attenuator for interfacing to the IF post-processor. A user-interface allows RF TX and RX frequency selection, data rate selection, and configurable options including internal or external diplexer, internal or external oscillator reference, and TX amplifier keying to allow simplex, half duplex, or full duplex communication.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings, wherein like reference numerals refer to like parts and wherein.

DESCRIPTION OF THE PREFERRED EMBODIMENT

Figure 1:
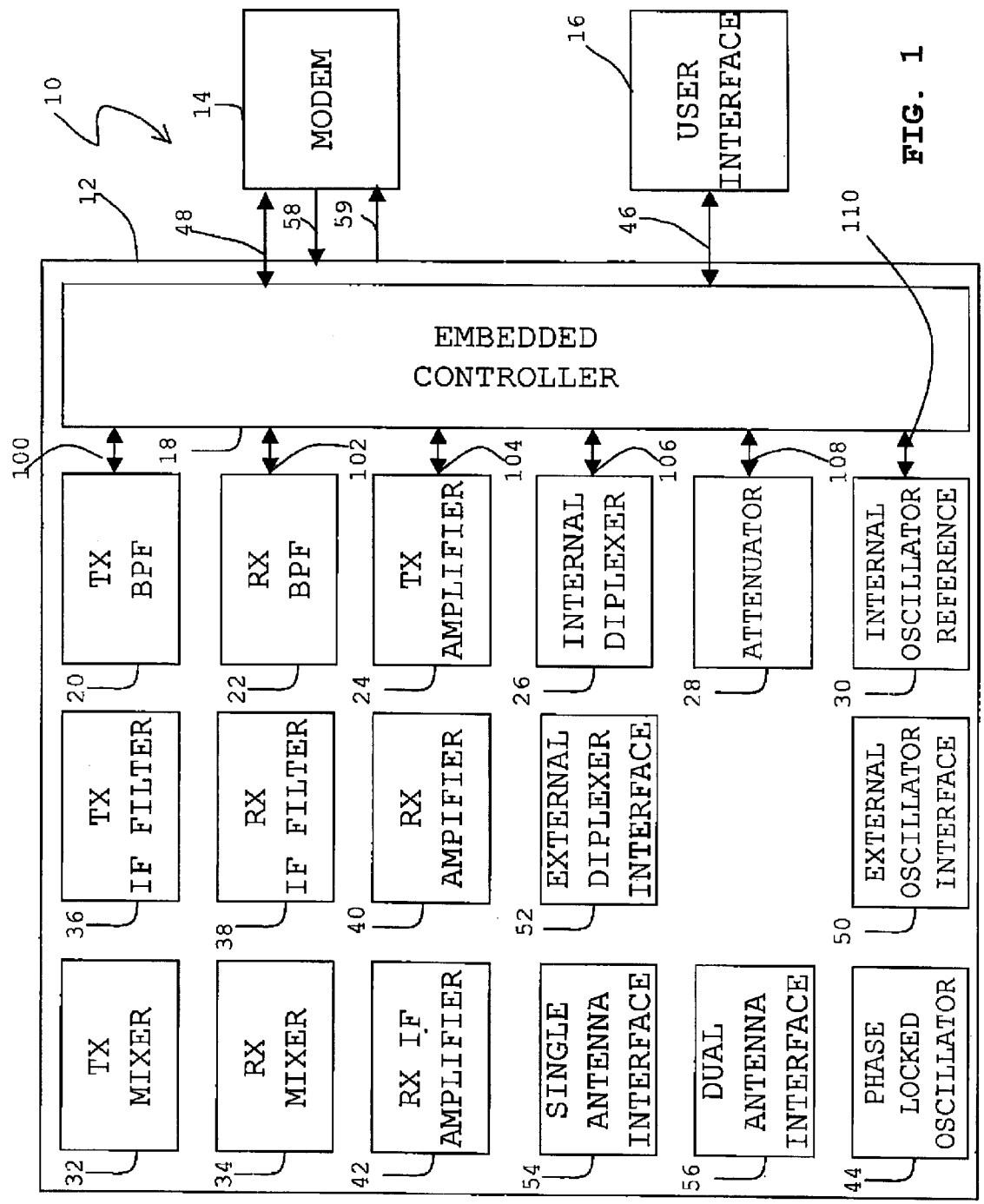
FIG. 1 is a block diagram of the RF transceiver for the preferred embodiment wherein the IF generator is a modem.

Referring now to FIG. 1, there is shown a block diagram 10 of the transceiver system, further detailing individual transceiver components. In the preferred embodiment, the transceiver 12 interfaces to a modem 14 that provides a varying IF to the transceiver 12. The modem's 14 variable IF is specified through a user-interface 16 that allows a user to specify communication parameters. Communication parameters specified through the user-interface 16 include satellite or line-of-site (LOS) communication, RF transmit (TX) frequency, RF receive (RX) frequency, communication data rate, internal or external oscillator reference, and transmit power amplifier keying options.

An embedded controller 18 controls the user-interface 16 and initializes transceiver 12 components according to user selections. The embedded controller 18 uses the user-selected transmit (TX) and receive (RX) RF frequencies to compute respective TX and RX intermediate frequency (IF) values, and the. embedded controller 18 transfers the TX and RX IF frequency values to the modem 14. The embedded controller 18 also uses the TX and RX RF frequencies to specify the respective TX and RX band-pass filter (BPF) 20, 22 coefficients through interfaces 100 and 102.

The embedded controller 18 accepts a user-selected data rate from the user-interface 16, and provides the data rate to the modem 14. The TX amplifier 24 is additionally keyed by the embedded controller 18 through interface 104 according to user-interface designations of constant on, constant off, or request to send (RTS) control, thereby providing a mechanism that allows the transceiver to perform in full duplex, half duplex, or simplix modes. In the preferred embodiment, when satellite communication is user-specified, the embedded controller enables the internal diplexer 26 through interface 106.

Figure 2:
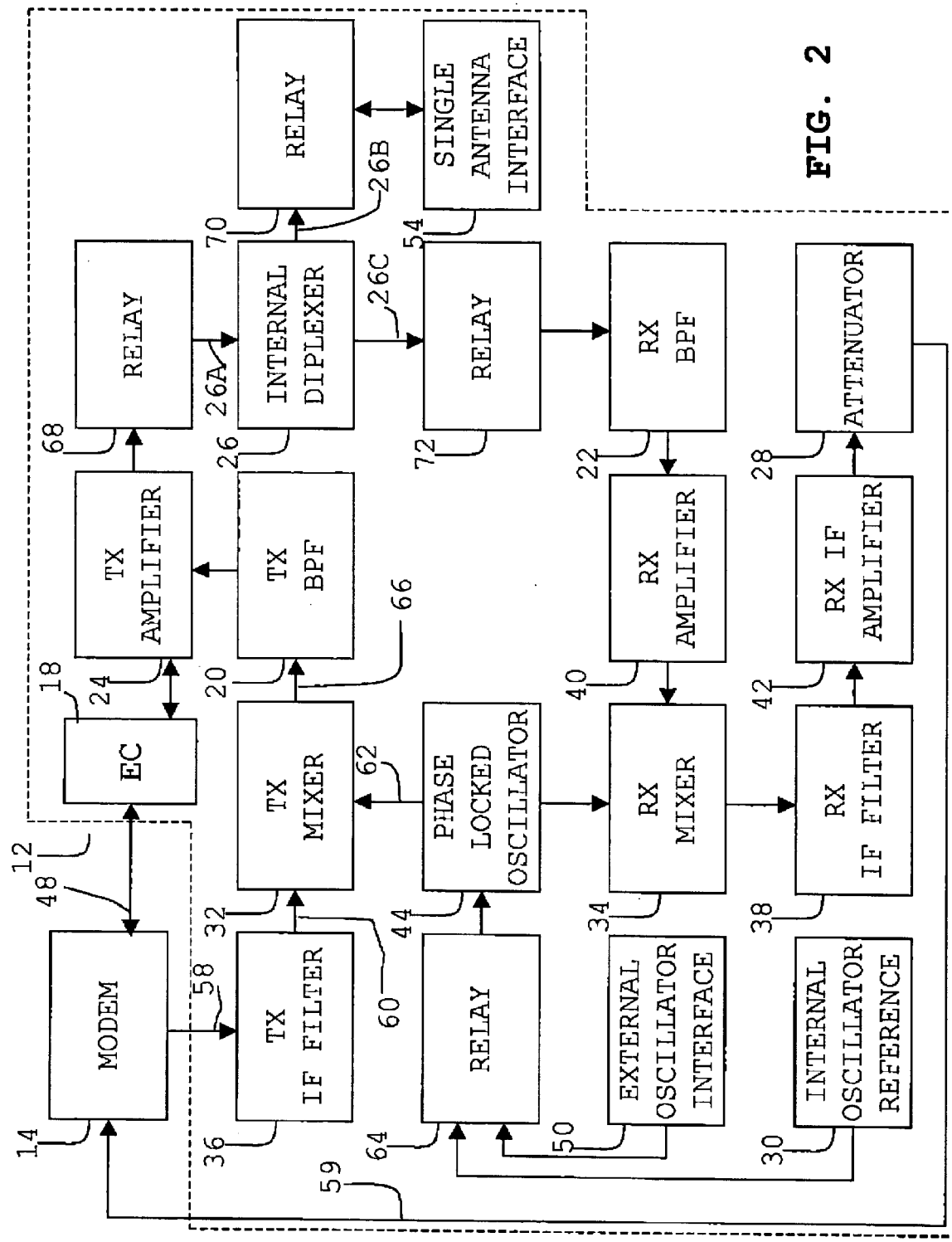
FIG. 2 is a block diagram of the RF transceiver up-conversion and down-conversion paths for a single antenna configuration utilizing an internal diplexer.
Figure 3:
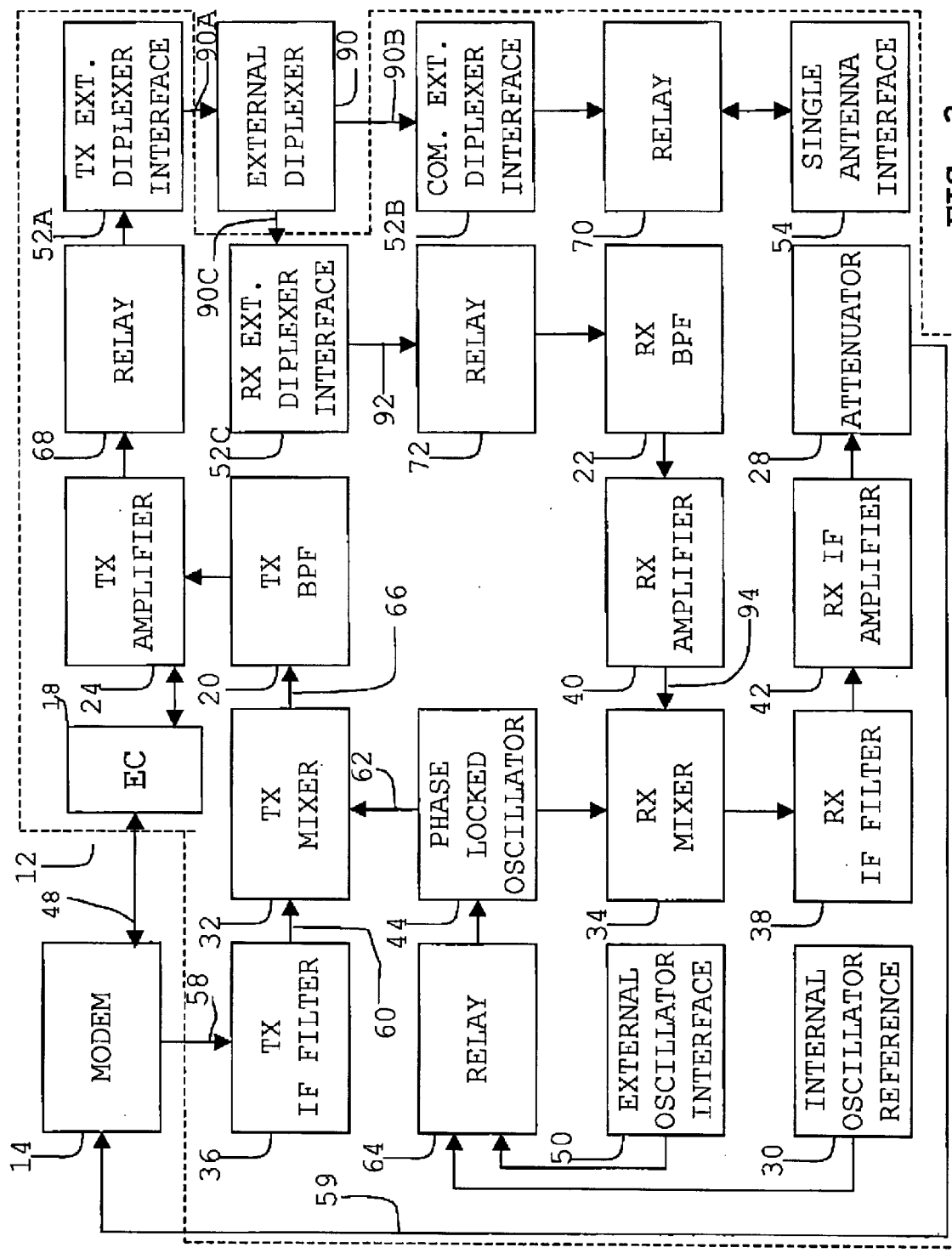
FIG. 3 is a block diagram of the RF transceiver up-conversion and down-conversion paths for a single antenna configuration utilizing an external diplexer; and, FIG. 4 is a block diagram of the RF transceiver up-conversion and down-conversion paths for a dual antenna configuration.
Figure 4:
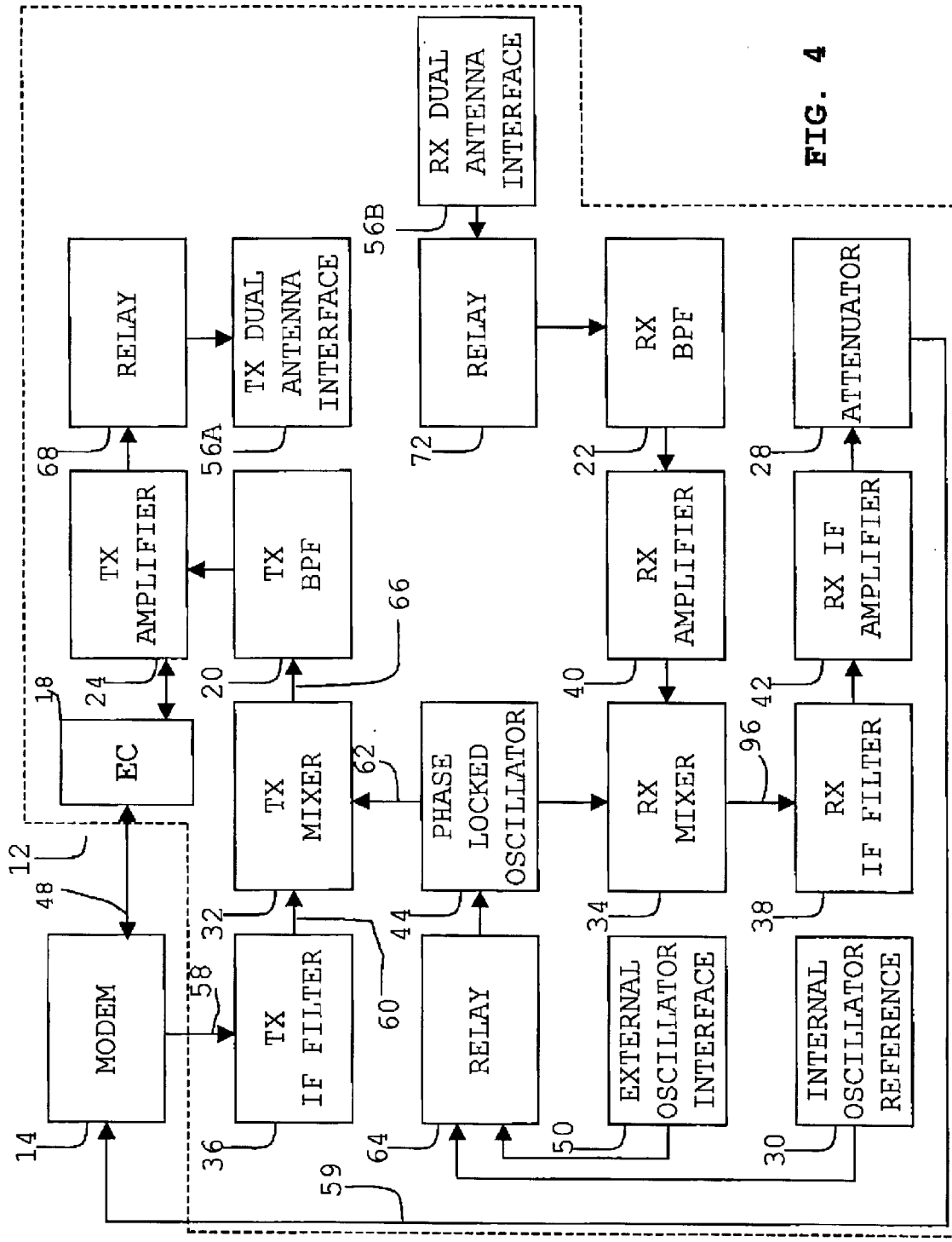

As will be shown in FIGS. 2, 3, and 4, the down-conversion path comprises an attenuator 28. In the preferred embodiment, the attenuator 28 is digital and controlled by the embedded controller 18 through interface 108 to maintain a desired signal level at the attenuator output. The embedded controller 18 also enables the internal oscillator reference 30 through interface 112 depending upon whether the user selects (via the user interface) internal or external oscillator reference.

Other components comprising the transceiver 12 are the TX mixer 32, RX Mixer 34, TX IF Filter 36, RX IF Filter 38, RX Amplifier 40, RX IF Amplifier 42, and at least one fixed Phase-Locked Oscillator (PLO) 44. The preferred embodiment transceiver 12 also maintains an embedded controller/user-interface interface 46 to allow user-interface control by the embedded controller, user-entered data transfer, and transmission of performance data for user-interface display; an embedded controller/IF modem interface 48 to transfer computed IF frequencies and user-entered data rates from the embedded controller 18 to the modem 14, and received signal levels and error rates from the modem 14 to the embedded controller 18; an external oscillator interface 50 to allow an external oscillator reference to drive the fixed PLO(S) 44 when the internal oscillator is not selected; an external diplexer interface 52 to provide for external diplexer configurations; a single (TX/RX) antenna interface 54; a dual antenna interface 56; a TX IF interface 58 to accept TX IF signals from the modem 14; and, a RX IF interface 59 to transfer down-converted RX IF signals from the transceiver 12 to the modem 14.

Referring now to FIG. 2, there is shown the up-conversion and down-conversion paths for a single antenna configuration using the internal diplexer. The modem 14 provides an IF frequency to the transceiver 12 as directed by the transceiver's embedded controller and based upon the user-entered, TX RF frequency and fixed PLO values 44. The modem's 14 TX IF frequency is transferred to the transceiver 12 through the TX IF interface between the modem and transceiver 58 and input to the TX IF filter 36. The TX IF Filter output 60 provides one input to the up-conversion (TX) mixer 32. The fixed PLO(s) 44 provide(s) the TX mixer 32 with a second input 62. The fixed PLO(s) 44 is selected to achieve the user-selected TX RF frequency, recalling that the TX IF provided by the modem 14 was calculated by the embedded controller 18 using the user-selected TX RF frequency and a fixed PLO 44 value.

In the preferred embodiment, the fixed PLO(s) 44 is driven by a relay 64 that maintains connections to the internal oscillator 30 and an external oscillator interface 50. The relay 64 is activated depending upon the user selection for internal or external oscillator reference. Although FIG. 2 indicates a single fixed PLO 44, multiple fixed PLOs may be utilized to provide a larger TX (and RX) RF frequency selection.

The IF filter output 60 and fixed PLO output 62 provide the mixer 32 with signals to achieve the desired TX RF frequency at the mixer output 66. The mixer output 66 is input to the TX band-pass filter (BPF) 20 that is tuned by the embedded controller 18 for the appropriate TX RF frequency, and amplified 24. In the preferred embodiment, the amplifier 24 interfaces to a relay 68, the output of which connects to the internal diplexer 26 TX input 26a. In the preferred embodiment, the internal diplexer 26 combined output 26b connects to a relay 70 for interfacing to the single antenna 54.

The FIG. 2 down-conversion path includes the internal diplexer 26, whose RX input 26c is connected to a relay 72 and thereafter a RX BPF 22 tuned to the user-specified RX RF frequency. The RX RF signal is then amplified 40 before input to the down-conversion path (RX) mixer 34. A fixed PLO 44 provides the second input to the down-conversion path mixer 34 to generate an IF signal that is filtered 38 and amplified 42 before being attenuated 28 and transferred to the modem 14 using the RX IF interface 59.

Referring now to FIG. 3, there is shown a single antenna configuration utilizing an external diplexer. Similar to FIG. 2, the modem 14 provides the variable TX IF to the transceiver 12 through the TX IF interface 58, and the IF signal is filtered 36 and provided as one input 60 to the up-conversion mixer 32. A PLO 44, driven by either an internal oscillator reference 30 or an external oscillator through the external oscillator interface 50, provides the second mixer input 62. The up-conversion mixer 32 provides a TX RF signal 66 that is band-pass filtered 20, amplified 24, and connected through relay 68 to the TX external diplexer interface 52a. The external diplexer TX terminal 90a accepts the TX signal, while the external diplexer combined terminal 90b returns to the transceiver 12 through the external diplexer combined interface 52b, connecting to a relay 70 and hence the single antenna interface 54. The external diplexer RX terminal 90c returns to the transceiver 12 via the RX external diplexer interface 52c. The RX RF signal 92 begins the down-conversion path by passing through a relay 72, RX BPF 22 tuned by the embedded controller to the user-specified RX RF frequency, and amplifier 40. The amplified RF signal 94 is input to the down-conversion mixer 34 with a signal from a fixed PLO 44 to convert the RF signal to IF, whereupon the IF signal is filtered 38, amplified 42, and attenuated 28 for transmission to the modem 14 through the RX IF interface 59.

Referring now to FIG. 4, there is shown a dual antenna configuration wherein a first antenna designated the TX antenna, and a second antenna designated the RX antenna, are connected to the transceiver dual antenna interface 56. The up-conversion path connected to the TX antenna is similar to the up-conversion paths of FIGS. 2 and 3, with the omission of a diplexer. Once again, the modem 14 provides a variable TX IF to the transceiver 12 through the TX IF interface 58, whereupon the TX IF signal is filtered 36 and input to a mixer 32 with a signal from a fixed PLO 44. A fixed PLO 44 may be driven by an internal reference 30 or by an external oscillator through the external oscillator interface 50. The mixer output 66 is a RF signal that is input to the TX BPF 20, amplified 24, and connected to the dual antenna interface's TX antenna terminal 56a through a relay 68. The down-conversion path begins with the signal from the dual antenna interface's RX antenna terminal 56b that is sent through a relay 72, RX BPF 22, and RF amplifier 40, before being input to the RX mixer 34. The other RX mixer input is derived from a fixed PLO 44, and the RF mixer output 96 is an IF signal that is filtered 38, amplified 42, and attenuated 28 before it is returned to the modem 14 via the RX IF interface 59 for post processing.

The advantage of the present invention over the prior art is that a RF signal can be derived from a variable IF using a fixed PLO, thereby allowing increased data rate communication.

What has thus been described is a RF front end to an IF generator and post-processor whereby the IF generator output is variable. The transceiver up-conversion path includes an IF Filter, the output of which is input to a mixer with the output of a fixed Phase Locked Oscillator (PLO). The mixer output is input to a band-pass filter and amplified. With a single antenna configuration, the amplifier output connects to either an internal or external diplexer that interfaces to the antenna. With a dual antenna configuration, the amplifier output interfaces directly to the antenna. Similarly, the down-conversion path includes an internal or external diplexer in the single antenna configuration, a band-pass filter, a RF amplifier, a mixer that receives the RF amplifier output and the fixed PLO as inputs, an IF Filter, IF amplifier, and an attenuator for interfacing to the IF post-processor. A user-interface allows RF TX and RX frequency selection, data rate selection, and configurable options including internal or external diplexer, internal or external oscillator reference, and TX amplifier keying to allow simplex, half duplex, or full duplex communication.

Although the present invention has been described relative to a specific embodiment thereof, it is not so limited. Obviously many modifications and variations of the present invention may become apparent in light of the above teachings. For example, although the preferred embodiment indicated the presence of relays in the up-conversion and down-conversion paths, the relays may be replaced by another appropriate device, or omitted entirely. The amplifier may require a pre-amplifier depending on signal and amplifier characteristics. Multiple, fixed PLOs may be utilized to offer greater ranges of TX and RX RF selection. Although the preferred embodiment indicated a fixed PLO feeding the TX and RX mixers, depending upon the user-selected TX and RX RF frequencies, the fixed PLO output to the TX and RX mixers may be different, and may be derived from a different fixed PLO. The RF signal may be any frequency range, including but not limited to UHF, VHF, etc. Although the description provided three external diplexer interface components, these interfaces may in fact represent a single component. Similarly, the dual antenna interface may be a single interface for two antennae, or dual interfaces. The TX IF interface and RX IF interface between the transceiver and modem may also be a single interface. Although the described transceiver operates in full duplex mode, the constant on, constant off, and RTS TX amplifier control options provide for simplex, half-duplex, or full duplex operation. Although the preferred embodiment indicated diplexer use only in single antenna configurations, diplexers may be utilized in the dual antenna configuration. The attenuator may be digital or analog. Any variable, IF frequency generator and post-processor can substitute for the modem. Although the transceiver architecture was shown in three basic configurations to encompass the configurable options within the preferred embodiment, a single configuration may be selected and implemented individually.

Many additional changes in the details, materials, steps and arrangement of parts, herein described and illustrated to explain the nature of the invention, may be made by those skilled in the art within the principle and scope of the invention. It is therefore understood that within the scope of the appended claims, the invention may be practiced otherwise than as specifically described.

What is claimed is:

1. The transceiver system capable of simplex, half-duplex, or full duplex operation, comprising:
   a variable Intermediate Frequency (IF) generator and post-processor;
   a user-interface;
   a transceiver, said transceiver further comprising:
      an embedded controller;
      a first interface between said embedded controller and said variable IF generator and post-processor;
      a distinct second interface between said variable IF generator and post-processor and said transceiver, said distinct second interface to transfer variable transmit (TX) IF signals from said variable IF generator and post-processor to said transceiver, and said distinct second interface to transfer said receive (RX) IF signals from said transceiver to said variable IF generator and post processor;
      a distinct third interface between said embedded controller and said external user-interface;
      at least one antenna interface;
      an up-conversion path to convert said variable TX IF signals to TX Radio Frequency (RF) signals, said up-conversion path further comprising at least one fixed Phase Locked Oscillator (PLO), a transmit (TX) IF filter, said TX IF filter input being said variable TX IF signals generated by said variable IF generator and post-processor, a TX mixer having a first input and a distinctive second input, said first input being said TX IF filter output, said second input being one of said at least one fixed PLO output, a TX band-pass filter (BPF) connected to said TX mixer output, a TX amplifier connected to said TX BPF output, said TX amplifier configurable for constant on, constant off, or request to send (RTS) control, said up-conversion path connecting said TX RF signals to one of said at least one antenna interface;
      a down-conversion path connected to one of said at least one antenna interface, said down-conversion path to convert received (RX) RF signals to said RX IF signals, said down-conversion path further comprising said at least one fixed PLO, a receive (RX) BPF, said RX BPF input being said RX RF signals, a RX amplifier connected to said RX BPF output, a RX mixer having a first input and a distinctive second input, said first input being said RX amplifier output, said second input being one of said at least one fixed PLO output, a RX IF Filter connected to said RX mixer output, and a RX IF amplifier connected to said RX IF Filter output;

a distinct fourth interface between said embedded controller and said transmit (TX) band-pass filter (BPF);

a distinct fifth interface between said embedded controller and said receive (RX) BPF;

a distinct sixth interface between said embedded controller and said TX amplifier;

a distinct seventh interface between said embedded controller and an internal diplexer, said internal diplexer further comprising an internal diplexer TX terminal, an internal diplexer RX terminal, and an internal diplexer common terminal;

an external diplexer interface, said external diplexer interface further comprising an external diplexer interface TX terminal, an external diplexer interface RX terminal, and an external diplexer common terminal;

an internal oscillator reference to drive said at least one PLO;

an external oscillator reference interface to allow said at least one PLO to be driven by an external oscillator; and, a distinct eighth interface between said embedded controller and said internal oscillator.

2. The transceiver system of claims 1, wherein said down-conversion path further comprises an attenuator connected to said RX IF amplifier output.

3. The transceiver system of claim 2, wherein said attenuator is a digital attenuator, and wherein said transceiver further comprises a distinct eighth interface between said digital attenuator and said embedded controller.

4. The transceiver system of claim 3, wherein said distinct second interface further comprises:

a TX IF interface between said TX IF filter and said variable IF generator and post-processor; and, a RX IF interface between said attenuator and said variable IF generator and post-processor.

5. The transceiver system of claim 4, wherein said at least one antenna interface further comprises:

a single antenna interface; and a dual antenna interface.

6. The transceiver system of claim 5, wherein:

said single antenna interface is configurable; and, said dual antenna interface further comprises a TX terminal and a RX terminal.

7. The transceiver system of claim 6, further comprising:

a first relay, said first relay input connected to said TX amplifier output;

a distinct second relay, said second relay output connected to said RX BPF input;

a distinct third relay, said third relay output connected to said single antenna interface; and a distinct fourth relay, said fourth relay having a first input and a distinct second input, said first input connected to said internal oscillator reference, said second input connected to said external oscillator reference interface, said fourth relay output connected to said one of at least one fixed PLO.

8. The transceiver system of claim 7, wherein:

said single antenna interface further comprises a first configuration and a distinct second configuration, said first configuration further comprising said first relay output connected to said internal diplexer TX terminal, said internal diplexer combined terminal connected to said third relay input, and said internal diplexer RX terminal connected to said second relay input, said distinct second configuration further comprising said first relay output connected to said external diplexer interface TX terminal, said external diplexer interface combined terminal connected to said third relay input, and said external diplexer RX terminal connected to said second relay input; and said dual antenna interface further comprises said first relay output connected to said dual antenna interface TX terminal, and said second relay input connected to said dual antenna RX terminal.

9. The transceiver system of claim 8, wherein said variable IF generator and post-processor further comprises a modem.

* * * * *